March 21, 1933.  J. L. BIGGS  1,902,755
CONFECTION MACHINE
Filed Aug. 12, 1931
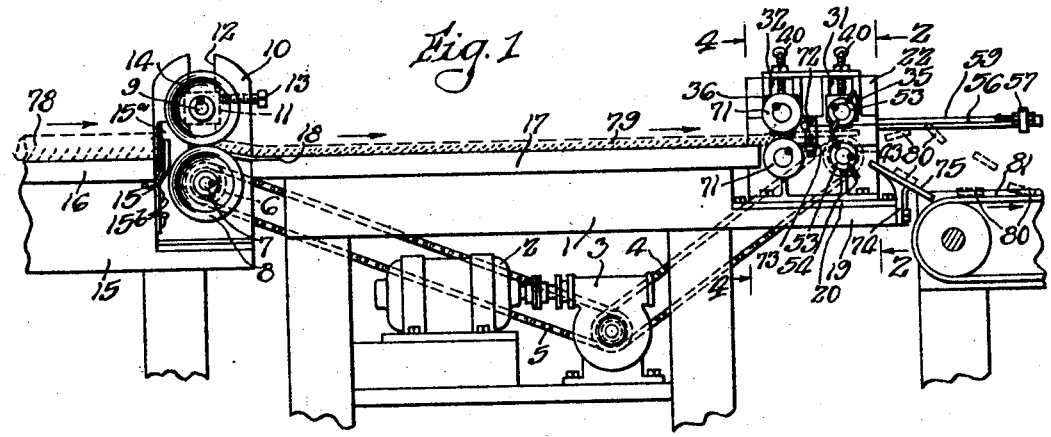
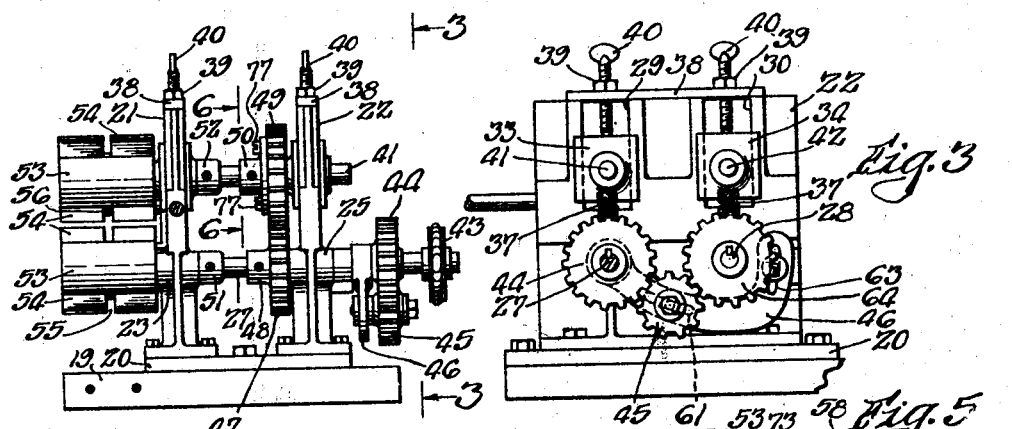
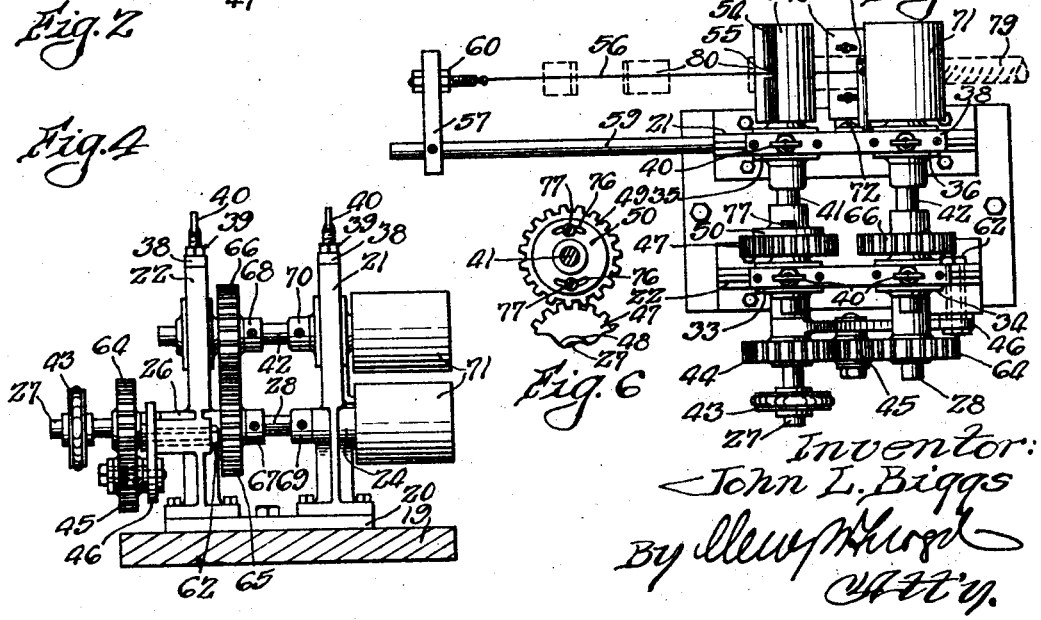
Inventor:
John L. Biggs Patented Mar. 21, 1933

1,902,755

UNITED STATES PATENT OFFICE

JOHN L. BIGGS, OF CHICAGO, ILLINOIS, ASSIGNOR TO QUEEN ANNE CANDY COMPANY, OF HAMMOND, INDIANA, A CORPORATION OF ILLINOIS

CONFECTION MACHINE

Application filed August 12, 1931. Serial No. 556,469.

The present invention relates to confection machinery and more particularly to a machine for cutting a confection into sections of uniform mass.

To the present time in the confection manufacturing industry, certain confections of a plastic consistency have been molded by hand into long strips of a circular cross section. These strips are then fed by hand between two drums revolving about parallel axis at constant speed, each drum carrying a plurality of blades coacting to cut the strips into short sections and discharging such sections at the opposite side of the drums.

These strips are not, since they are molded by hand, of a consistent and uniform cross section. The strips are drawn into the space between the above mentioned drums by frictional contact of those drums and the blades thereon with the strip. The speed with which the strip is permitted to progress between the drums is governed by the tension applied to the ingoing strip by the operator. A changing tension applied by the human operator is inevitable in resulting in various degrees of elongation and cross section. In fact, the elongation occurs at the section of smaller cross section to result in that particular cross section being made still more off size. Thus a strip of confection of variable and approximate cross sectional area is cut into sections of equal length, consequently to effect a discrepancy of importance in the weight of those sections, which fact is a serious objection to the conventional cutting method.

A second objection to the conventional method of cutting a confection is that the blades on the drums do not consistently free themselves of the cut sections, necessitating discontinuance of the operation to scavenge the surface of the drums.

Another objection to conventional machinery lies in the fact that the length of a cut section is varied by removing or inserting blades in the drums and therefore can be changed only by large increments. For instance, inserting a blade midway between each two adjacent blades or removing every other one of the present blades would result respectively in a fifty per cent and a one-hundred per cent change in the length of the present cut section.

The object of the present invention is to provide a machine to draw strips of a plastic confection material into any desired uniform cross section, to successfully and continuously and without interruption cut these strips into sections of equal length, which may by a minor adjustment of the machine be changed by small increments as desired from time to time.

With the above objects and other desirable objects referred to hereafter in view, the invention resides in the novel construction, unique combination, and improved arrangement of parts as set forth in the following specification, and defined in the appended claim.

With reference to the accompanying drawing in which like reference characters refer to the same parts througout, Figure 1 is an orthographic assembly drawing viewing a side of a machine embodying the invention;

Figure 2 is an orthographic longitudinal view of the cutting drums and associated gearing as indicated at section 2—2 of Figure 1;

Figure 3 is an orthographic end view of the cutting and feeding gears as indicated at 3—3 of Figure 2;

Figure 4 is an orthographic longitudinal view of the feeding drums and associated gearing as indicated at section 4—4 of Figure 1;

Figure 5 is an orthographic top view of the cutting and feeding drums with associated gears and standards therefor; and Figure 6 is an orthographic side view of the top cutting gear as indicated at line 6—6 in Figure 2.

In the accompanying drawing is a frame 1 (Figure 1) for the improved machine which includes legs, side bars, cross bars, and other suitable supporting elements arranged in any suitable manner and secured to form a rigid structure to support the main device.

Appended on the lower part of frame 1 is a prime mover 2, coacting with a gear 3 to actuate chains 4 and 5 concurrently. Chain 5 engages sprocket 6, which is keyed to a shaft 7 to, in turn, rotate a sizing roller 8 in a clockwise direction as shown in Figure 1. Shafts 7 and 9 are free to rotate in bearings located in an upright standard 10. The bearing of shaft 9 is within a bearing block 11 which is contained within and transverses vertically a slot 12, and is secured in the desired position by set screw 13. Hence the vertical distance between roller 14, which is keyed to shaft 9, and roller 8 can be varied by sliding bearing block 11 to different positions and securing it by means of set screw 13.

To a suitable frame 15 is secured offset guiding arm 15a by means of screws 15b. Also secured to the same frame 15 is a standard 10. As shown in Figure 1, the top 16 of frame 15 is cut away to accommodate standards 10 and attachments thereto, and elsewhere abuts top 17 of frame 1 which lies in the same horizontal plane. Countersunk in the left end of top 17 is metal plate 18, the left side of which is articulated to conform to the periphery of sizing roller 8 to ride thereon.

Anchored to member 19 of frame 1 is a metal plate 20, which in turn serves as an anchorage for standards 21 and 22 (Figures 2 and 4). Near the bottom of standard 21 are bearings 23 and 24 and in alignment with bearings 25 and 26 respectively, near the bottom of standard 22, and serve to accommodate shafts 27 and 28.

Directly above bearings 23, 24, 25 and 26 in the respective standards are vertical slots 29, 30, 31 and 32 respectively, open at the top to allow insertion of respective bearing blocks 33, 34, 35 and 36. These bearing blocks carry flanges along the vertical edges to envelop the material at the sides of the slots so as to prevent any horizontal movement but to allow the bearing blocks a vertical movement therein.

Seated in the bottom of each of the said slots is a coiled expansion spring 37 to exert a force on the bottom of the bearing block as it is then forced down into the slot. After the bearing blocks are within the respective slots, flat bar members 38 are secured to the top of standards 21 and 22, and carry thereon threaded lugs 39, to engage set screws 40 to coact with springs 37 to adjust the height of the bearing blocks. Bearing blocks 33 and 35 carry shaft 41, and bearing blocks 34 and 36 carry shaft 42.

Chain 4 engages a sprocket wheel 43 keyed to and near the back end of shaft 27. On shaft 27 intermediate sprocket wheel 43 and standard 22 is a gear wheel 44 which engages the teeth of an idler 45, which will be described more in detail later. Progressing still further toward the front of shaft 27 will next be observed an adjustable arm 46 in the shape of a bell crank and free to rotate about shaft 27. Near standard 22 intermediate standards 21 and 22 and keyed to shaft 27 is a gear wheel 47, which is held in a fixed longitudinal position thereon by a collar 48, the teeth thereon engaging with those on gear wheel 49 directly above and mounted on shaft 41 but not keyed thereto, and held in a fixed position thereon by a flanged collar 50.

Intermediate collars 48 and 50 on shaft 27 and 41, respectively, and standard 21 are collars 51 and 52 which are contiguous to the bearings in standard 21 and coact with collars 48 and 50 to prevent longitudinal movement of shafts 27 and 41.

Keyed to the front of shafts 27 and 41 are drums 53, each with two blades 54 diametrically opposite. The blades are coextensive with the length of the drum longitudinally of the rotating axis thereof and have one edge embedded in the periphery of the drum so that the blade extends radially therefrom. Gear wheels 47 and 49 have the same number of teeth so that shafts 27 and 41, hence drums 53, rotate at the same rate of speed. A detail in Figure 6 illustrates how shaft 41 with collar 50 attached thereto can be rotated within gear 49 to limits confined by the extremities of slot 76 and is held in the desired relative position by set screws 77. Then with gears 47 and 49 engaged shaft 41 can be rotatively adjusted so that the two blades 54 transverse the plane between the axis of drums 53 simultaneously as shown in Figure 2.

Midway the two ends of blades 54 are cut away sections 55 which accommodate a taut wire 56 intermediate arm 57 and pin 58. Arm 57 is attached to rod 59 which is anchored to standard 21, and pin 58 is anchored directly into the side of standard 21 to project normally thereto. Wire 56 is changed in tension by the screw arrangement 60 on arm 57.

Returning to adjustable arm 46 which carries idler wheel 45 in longitudinal slot 61, it will be observed that a bolt 62, (Figure 5) is secured to standard 22 and engages arm 46 by means of slot 63. Slot 63 generates an arc about shaft 27 as an axis and permits arm 46 to be rotated about shaft 27 within the limits of said slot, and is held at any position intermediate those limits by tightening the nut on bolt 62. Thus, by shifting the position of adjustable arm 46 and concurrently the axis of idler wheel 45 in slot 61, idler 45 can be made to engage a plurality of diameters in a gear wheel 44 while also engaging driven gear wheel 64 on shaft 28 resulting in a number of different rotative speeds of driven gear wheel 64 relative to driving gear wheel 44.

Intermediate standards 21 and 22 keyed to shaft 28 is gear wheel 65 which is of the same diameter and engages gear wheel 66 directly above and keyed to shaft 42. Collars 67 and 68 are stationarily secured to shafts 28 and 42 and coact with the bearing ends in standard 22 to prevent longitudinal movement of gear wheels 65 and 66. Collars 69 and 70 are stationarily secured to shafts 28 and 42 to thrust against the ends of bearings in standard 21 to coact with gear wheels 65 and 66 which thrust against the ends of bearing in standard 22 to prevent longitudinal movement of shafts 28 and 42.

To the front ends of shafts 28 and 42 are feeding drums or rollers 71. Between drums 53 and rollers 71 and mounted on the side of standard 21 is bracket 72 supporting platform 73 (Figures 1 and 5). Reference to Figure 1 will show that the left edge of platform 73 rides the periphery of lower feeding roller 71. To the right end of member 19 of frame 1 is bolted upright bracket 74, with a slanting plate 75 attached thereto.

In the process of operation a strip of plastic confection 78 (Figure 1) which has been molded by hand to approximate the desired diameter, is guided between sizing rollers 8 and 14, by guiding arm 15a. Chain 5 actuated by prime mover 2 turns roller 8 in a clockwise direction (Figure 1) and the confection material 78 is of a sufficient cross section to press firmly against the periphery of both rollers 8 and 14 to provide a medium whereby roller 8 actuates roller 14 in a counter-clockwise direction so that the two rollers coact to pull strip 78 therebetween and mold it into a strip of a uniform and smaller diameter.

Uniform strip 79 passes over top 17 of frame 1 as it is drawn by to pass between feeding rollers 71 of which the upper and lower rotate in anti-clockwise and clockwise direction respectively, by means of the gear linkage driven by chain 4 engaged with sprocket 43 and described heretofore.

Having been compressed by the pressure of feeding rollers 71, strip 78 is guided over platform 73 to be cut in sections 80 of a selected uniform length by blades 54 carried by drums 53 to penetrate opposite sides of strip 78 simultaneously. The severed sections 80 are discharged rapidly by blades 54 and come in contact with the taut wire 56 which prevents them from flying into space, and causes them to fall upon a conveyor 81 or upon a plate 75 to then slide onto the conveyor.

Because of the sections 55 in the blades upon the lower roller 53 there is left a thin ligature of confection material between the lower side of the strip not yet advanced into the cutting rollers and the piece substantially cut therefrom. Such a ligature is also left at the top side of the strip by the notches 55 in the upper roller 53. The notches in the upper roller are for accommodating the wire 56, and the ligature formed thereby is incidental. However, this upper ligature has a tendency because of its tenacity to cause the severed piece of confection to cling to the upper blade and fly upwardly as it is discharged therefrom. When a ligature is formed at the bottom of the severed piece, the piece has a like tendency to cling to the lower blade to overcome the force effecting an upward flight of the piece. Thus the wire 56 is assisted to control the trajectory of the discharged pieces.

The size of sections 80 can be changed by varying either their length, or cross section, or both. To change the cross section thereof, shaft 9 is raised or lowered by loosening set screw 13 to adjust the height of bearing block 11. Then, depending on whether roller 14 was raised or lowered, rollers 71 will be changed for others of a different periphery contour, or bearing blocks 34 and 36 will be raised or lowered to thus provide a corresponding space between feeding rollers 71. When bearing blocks 34 and 36 are raised or lowered, it necessitates changing gear wheels 65 and 66 for wheels of a larger or smaller diameter than the teeth thereon will engage. Then the space between rollers 8 and 14, and also between rollers 71 is adjusted by changing to rollers of a different peripheral contour or by changing the position of the associated bearing blocks to deliver a confection strip of a different uniform diameter to cutting blades 54. Usually the peripheral contour of the rollers when changed from that of a true cylinder will be such as to make the rollers of less diameter at a central portion or to lend the appearance of grooved pulleys to the rollers.

Reference to Figure 3 illustrates that by increasing the diameter of driving gear 44, driven gear 64 through the association of idler 45 can be made to turn with greater speed relative to gear 44. Hence shaft 28 rotates at a faster speed relative to shaft 27 with the result that the feeding rollers which operate at a speed directly proportional to shaft 28 feed a longer section of confection to the blades before they operate to sever it. It logically follows that inserting a gear wheel of smaller diameter in place of the present gear wheel 44 would result in the severing of shorter section of the confection.

What I claim is new and desire to secure by Letters Patent of the United States is:—

In a confection machine, the combination of two drums disposed upon parallel axes, blades having cutaway sections and extending radially from the periphery of said drums, and a taut wire intermediate said drums and arranged normally to said axes, said drums being timed to rotate so that a blade on either of said drums traverses the plane common to said axes simultaneously, said wire being cleared by the cutaway sections of one of said drums.

JOHN L. BIGGS.